United States Patent [19]

Takei

[11] Patent Number: 4,962,958

[45] Date of Patent: Oct. 16, 1990

[54] LINING LAMINATE FOR A PIPELINE

[76] Inventor: Norio Takei, 19-24, Mita 4-Chome, Minato-Ku, Tokyo, Japan

[21] Appl. No.: 334,283

[22] Filed: Apr. 6, 1989

[30] Foreign Application Priority Data

Jun. 3, 1988 [JP] Japan .................. 63-135409

[51] Int. Cl.⁵ ............................................. F16L 09/14
[52] U.S. Cl. .................... 285/55; 285/363; 285/368; 285/337
[58] Field of Search ....... 285/55, 223, 47 (U.S. only); 265/363, 368, 337

[56] References Cited

U.S. PATENT DOCUMENTS

| | | | |
|---|---|---|---|
| 2,857,931 | 10/1958 | Lawton | 285/55 |
| 3,202,562 | 8/1965 | Lang et al. | 285/55 X |
| 3,369,826 | 2/1968 | Boosey et al. | 285/47 |
| 3,561,795 | 2/1971 | Becher | 285/55 |
| 4,063,755 | 12/1977 | Merz | 285/55 X |

FOREIGN PATENT DOCUMENTS

| | | |
|---|---|---|
| 1232553 | 2/1988 | Canada . |
| 0100579 | 2/1984 | European Pat. Off. . |
| 3113998 | 10/1982 | Fed. Rep. of Germany . |
| 2550309 | 2/1985 | France . |
| 52-40541 | 3/1977 | Japan . |
| 57-155278 | 9/1982 | Japan . |
| 60-121380 | 6/1985 | Japan . |
| 61-282687 | 12/1986 | Japan . |

Primary Examiner—Dave W. Arola
Attorney, Agent, or Firm—Young & Thompson

[57] ABSTRACT

A lining laminate for lining line pipes to be connected to each other comprises a woven fabric impregnated with a liquid plasticizer, a pressure sensitive adhesive layer and a lining tube. This lining laminate is adhered to inner peripheral surfaces of connected line pipes, and further a pressure sensitive adhesive is filled in an annular space produced in an expansion joint portion for connecting line pipes to each other.

2 Claims, 8 Drawing Sheets

FIG_1
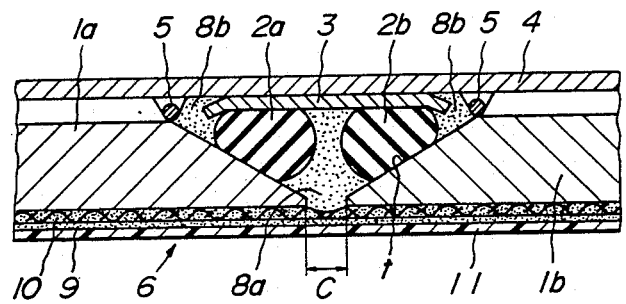
FIG_2
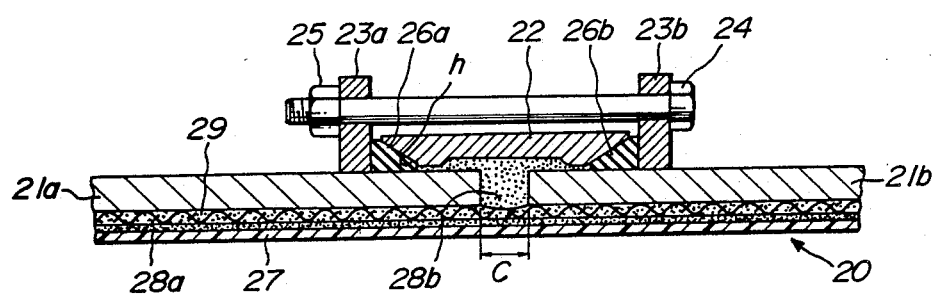

FIG_3
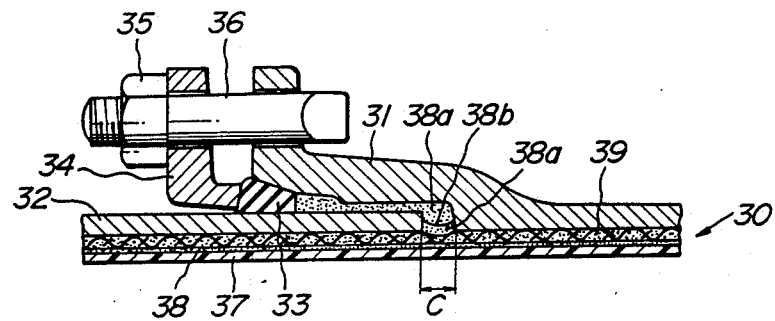
FIG_4
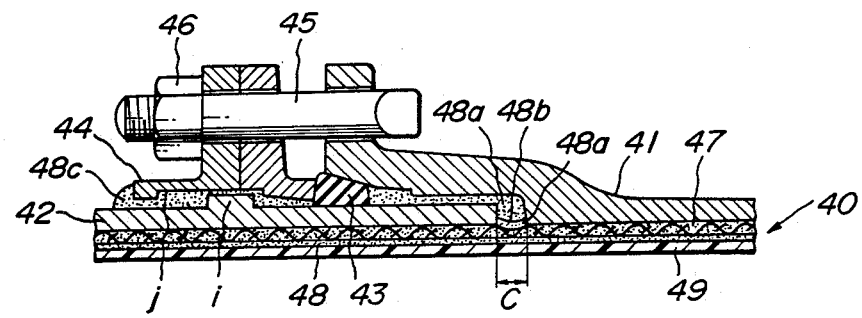

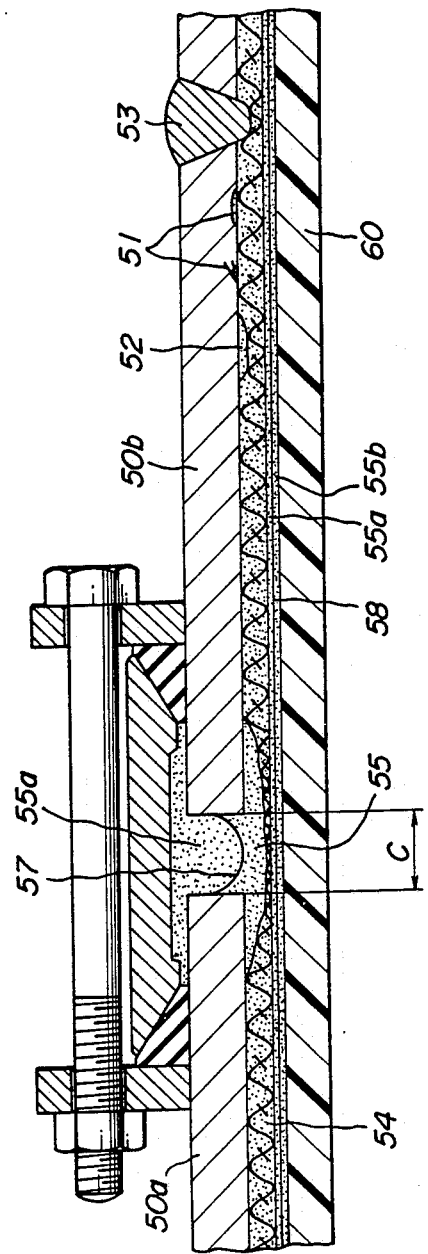

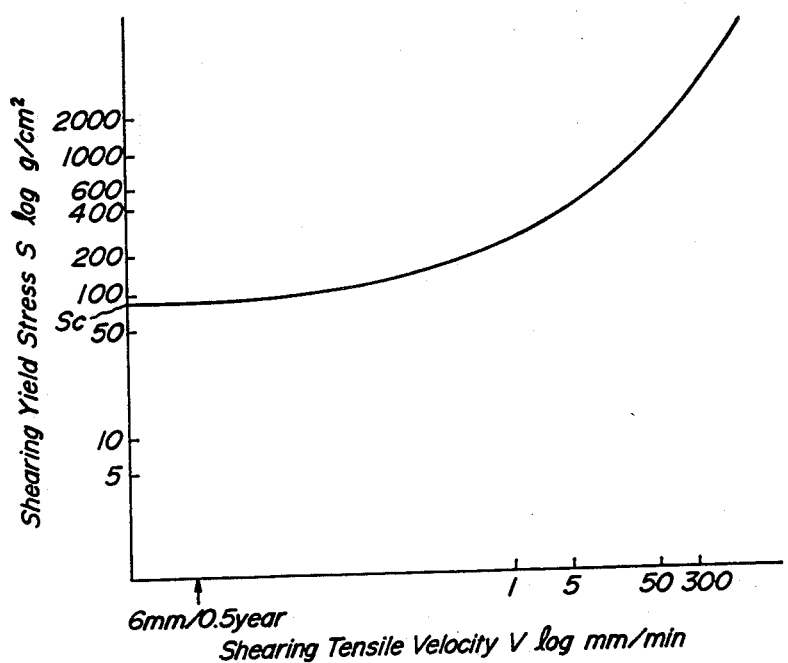
FIG_6

FIG_7
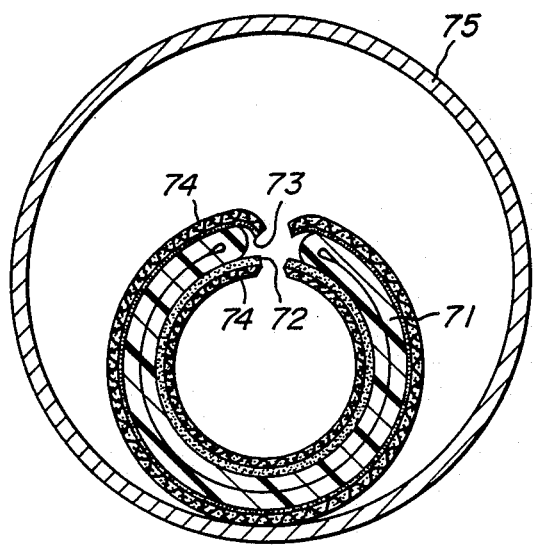

FIG_10a
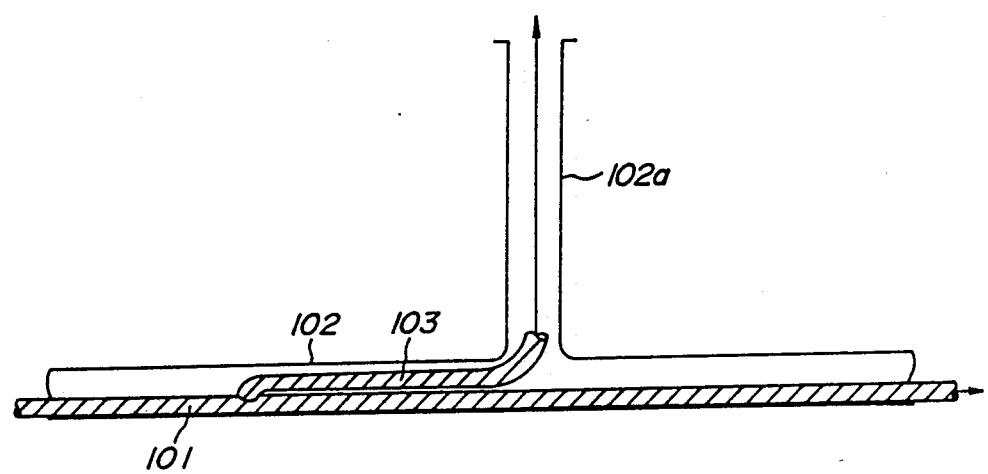
FIG_10b
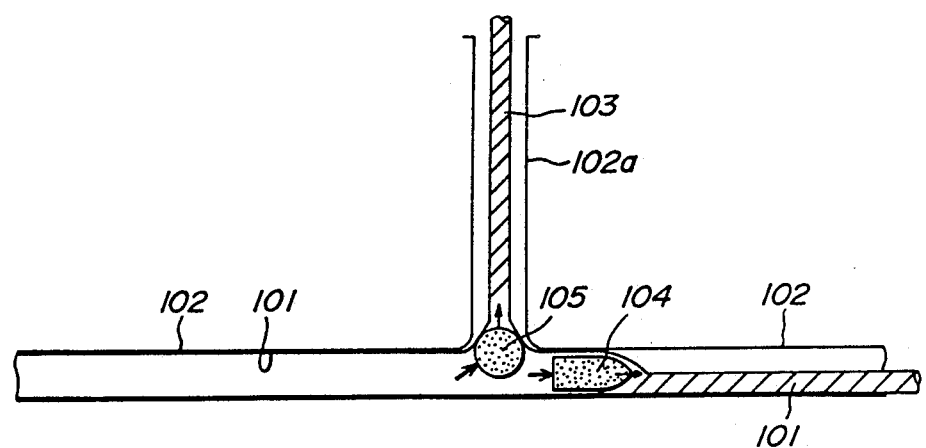

LINING LAMINATE FOR A PIPELINE

BACKGROUND OF THE INVENTION

1. Field of the Invention

This invention relates to a line pipe provided with a lining laminate containing a pressure sensitive adhesive. Particularly, it relates to a line pipe usable for rehabilitation of various existing pipelines, transportation of an abrasive fluid such as slurry, particles, dredged sand and stone or the like, transportation of a corrosive fluid such as sea water, $CO_2$ gas, sour gas or the like, transportation of stored water in water-power generation, transportation of service water and sewage, transportation of hot water in geothermal power generation, hot spring and the like.

2. Related Art Statement

At the present, a method wherein water reserved in a dam is led up to a position having a large water falling difference through a water passage tunnel and passed therefrom through a water pressure iron pipe to a power plant is adopted as a technique for the transportation of reserved water in water-power generation.

In such a known method, it is common to arrange a sand settling equipment on an inlet of the water passage tunnel for removing sand. Still, sand-containing water passes through the water pressure iron pipe at a high speed of 2~10 m/sec, so that there is a drawback that the wearing of the iron pipe becomes conspicuous. For example, in a connecting portion between the pipes through an expansion joint, an annular space for expansion is arranged for overcoming the temperature difference (about 80° C.) accompanied with the difference between day and night, season change and the like. In this case, however, sand contained in the flowing water is entrapped into the annular space to cause a so-called strong erosion, and also this erosion is promoted due to cavitation produced by whirl flow, whereby the service life of the pipe is considerably shortened. Particularly, the settlement of earth and sand is apt to be caused in the annular space arranged in the connecting portion through the expansion joint. Considering, for example, a case that earthquake occurs at such a sedimentated state, the iron pipe slides in the axial direction of the pipe at such a state that sand is entrapped in the annular space. As a result, a rubber ring for sealing housed in the space is injured to cause water leakage.

In this connection, the inventor has previously proposed a method of rehabilitating the existing overage pipe as a technique for solving problems kept in the water pressure pipe in Japanese Patent laid open No. 61-282687. Even in this prior technique, however, it is an actual circumstance that the damage of the expansion joint due to the sliding of such a joint during the occurrence of earthquake can not sufficiently be prevented.

Namely, according to this prior technique, the portion corresponding to the above annular space forms a connecting portion in the lining, so that when rapid force such as earthquake or the like is applied to the connecting portion, the peeling and breakage of the connecting portion are apt to be caused, while the annular space is enlarged even under the action of moderate force such as temperature change or the like to cause the flowing of pressure sensitive adhesion layer disposed in the connecting portion and thinly stretch the lining tube. As a result, the lining tube becomes brittle and the service life of the pipe undesirably becomes shorter.

On the other hand, when aiming at the connecting portion between the above known line pipes, the lining structure, particularly the lining structure at the expansion joint portion has the following drawbacks:

At first, when the lining layer is not existent in the line pipe using the bellows or sleeve type expansion joint, the end portion of the pipe is apt to be broken by galling under an influence of sand and the like contained in the flowing water as previously mentioned, and also the sliding face of the sealing or the like is corroded to shorten the service life of the sealing.

In case of the line pipe provided with the lining layer, the influence of sand in the flowing water is less. However, since the lining tube is frequently bonded to the inner surface of the pipe through an adhesive, the lining tube and the adhesive layer can not cope with moderate stretching of the pipe accompanied with the temperature change, or the rapid sliding of the pipe due to earthquake or the like. In other words, the lining can not follow to the stretching of the expansion joint. For example, when the pipe is contracted due to the temperature drop (winter season, night) to enlarge the annular space, or when the pressure inside the pipe largely changes, a portion of the lining tube corresponding to the annular space portion in the joint is elongated to thin the thickness of the tube or form recess or protrusion. Further, a loading accompanied with the ordinary stretching is always added to the lining tube in addition to the above stretching, whereby the lining tube is ununiformized, and finally the degradation of the lining tube is promoted to shorten the service life of the pipe.

Even in case of the line pipe provided with the lining using the pressure sensitive adhesive sheet, it is impossible to supplement the pressure sensitive adhesive sheet by an amount in accordance with the increase of volume in the annular space portion produced in the contracting of the pipe, so that the lining layer is ununiformized or the peeling or breakage of the lining tube in the connecting portion between the pipes is caused to injury the sealing.

In general, defects such as rust, scale, scab and the like are existent in the inner surface of the line pipe and are usually made by voids. If the pipeline is formed by performing the lining at a void remaining state, high pressure gas, corrosion product and the like store in the void portions during the use of long period to cause blister in the lining layer, whereby the durability of the lining tube is lowered. Furthermore, the unadhesion portion of the lining is generated on a weld bead portion in the inner surface of the welded joint between the line pipes. Moreover, when the lining tube is drawn into the inside of the line pipe, there is caused a problem of peeling off the pressure sensitive adhesion layer from the lower portion of the lining tube.

SUMMARY OF THE INVENTION

It is, therefore, an object of the invention to provide a novel lining laminate structure for the line pipe capable of solving the above problems of the conventional techniques.

According to a first aspect of the invention, there is the provision of a line pipe provided with a lining laminate, wherein these pipes are connected to each other through an expansion joint and a lining tube is arranged in the inner surface of the pipe through a pressure sensitive adhesive, characterized in that said pressure sensitive adhesive not only is filled in an annular space of a connecting portion between said pipes through said expansion joint but also is interposed between said line pipe and said lining tube at a state reinforced with a sheet, and a woven fabric impregnated with a liquid plasticizer containing a rust preventive agent is interposed between said pressure sensitive adhesive and said line pipe.

As the expansion joint in preferred embodiments of the first invention, there are the following four structures. In the first structure, a rigid outer sleeve provided at its inner peripheral surface with plural protrusions is fitted to an outer surface of an end portion of said line pipe to be connected to another line pipe, and a rubber ring and a rubber band are inserted into an annular space defined between the outer sleeve and a tapered part of said end portion and at the same time the pressure sensitive adhesive is filled in this annular space. In the second structure, an outer sleeve is fitted to an outer surface of an end portion of the line pipe to be connected to another line pipe through a pair of flanges, and a rubber ring is interposed between the flange and a tapered end portion of the outer sleeve and the pressure sensitive adhesive is filled in a space between the outer sleeve and an end of the line pipe to be connected. In the third structure, one of line pipes to be connected to each other is fitted into an end portion of another line pipe, and a rubber ring is inserted into a space between the fitted pipes, and the resulting assembly is fixed under a pressure through a ground cover, and the pressure sensitive adhesive is filled in a space produced int he connecting portion between the pipes. In the fourth structure, one of line pipes to be connected to each other is fitted into an end portion of another line pipe, and a rubber ring is inserted into a space between the fitted pipes, and the resulting assembly is fixed under a pressure through a ground cover, and the pressure sensitive adhesive is filled in not only a space defined between the inner peripheral surface and the contacting surface of the pipe but also a space defined between joint faces of the pipes.

In the other preferred embodiments of the first invention, the reinforcing sheet constituting the core of the pressure sensitive adhesive double coated sheet has a rigidity enough to withstand to shearing yield stress of the pressure sensitive adhesive and also has good aging and degradation resistance. The pressure sensitive adhesive has a shearing yield stress or not less than a friction force between the flowing water and the tube wall. Moreover, a separation sheet is embedded in the pressure sensitive adhesive filled in the annular space and is made from a material such as vinyl sheet or the like obstructing or restraining the diffusion of the liquid plasticizer. In addition, a wove fabric impregnated with the pressure sensitive adhesive is used instead of the woven fabric impregnated with the liquid plasticizer, and the lining tube, pressure sensitive adhesive and the woven fabric impregnated with the pressure sensitive adhesive are airtightly clamped by means of a flange arranged on the end portion of the line pipe.

A method for producing structure embodying the present invention by forming a long pipeline by connecting line pipes to each other through an expansion joint and arranging a lining tube on an inner peripheral surface of the line pipe through a pressure sensitive adhesive, comprises previously setting a ring-like pressure sensitive adhesive in an annular space portion defined by the expansion joint;

folding the lining tube in a flat form and at the same time piling and mounting a pressure sensitive adhesive double coated sheet embedding a reinforcing sheet therein and a woven fabric impregnated with a liquid plasticizer on upper and lower faces of the folded lining tube;

rounding the folded lining tube provided with the pressure sensitive adhesive sheet and the woven fabric in a cylindrical form and spirally winding a fastening string around the lining tube, and drawing the rounded lining tube into an inside of an end portion of the line pipe through the guiding of a wire rope and passing it through the line pipe;

fixing a rear end portion of the lining tube to the inner peripheral surface of the end portion at a leading-in side of the line pipe, and arranging a launcher for pig member at the leading-in side of the line pipe and a catcher for pig member at a feeding-out side of the line pipe;

fitting a pig member arranged in the launcher and having a freely shrinkable diameter larger than a diameter of the lining tube into a rear opening portion of the lining tube; and pumping a compressed air into the launcher to pressurize a back face of the pig member and simultaneously sucking air from the catcher to progress the pig member forward, whereby the folded lining tube is successively enlarged to push and adhere to the inner peripheral surface of the line pipe.

BRIEF DESCRIPTION OF THE DRAWINGS

The invention will be described with reference to the accompanying drawings, wherein:

FIGS. 1 to 4 are partly section views of various structures of the expansion joint portion in the line pipe according to the invention, respectively;

FIG. 5 is a schematic view illustrating behaviors of the separation sheet-containing pressure sensitive adhesive and the liquid plasticizer in the expansion joint portion;

FIG. 6 is a graph showing a relation between shearing tensile velocity and shearing yield stress in the pressure sensItive adhesive;

FIG. 7 is a sectional view illustrating the lining operation for the line pipe according to the invention;

FIGS. 10a and 10b are schematic views illustrating steps for lining a branched line pipe according to the invention, respectively.

DESCRIPTION OF THE PREFERRED EMBODIMENTS

Figure 8:
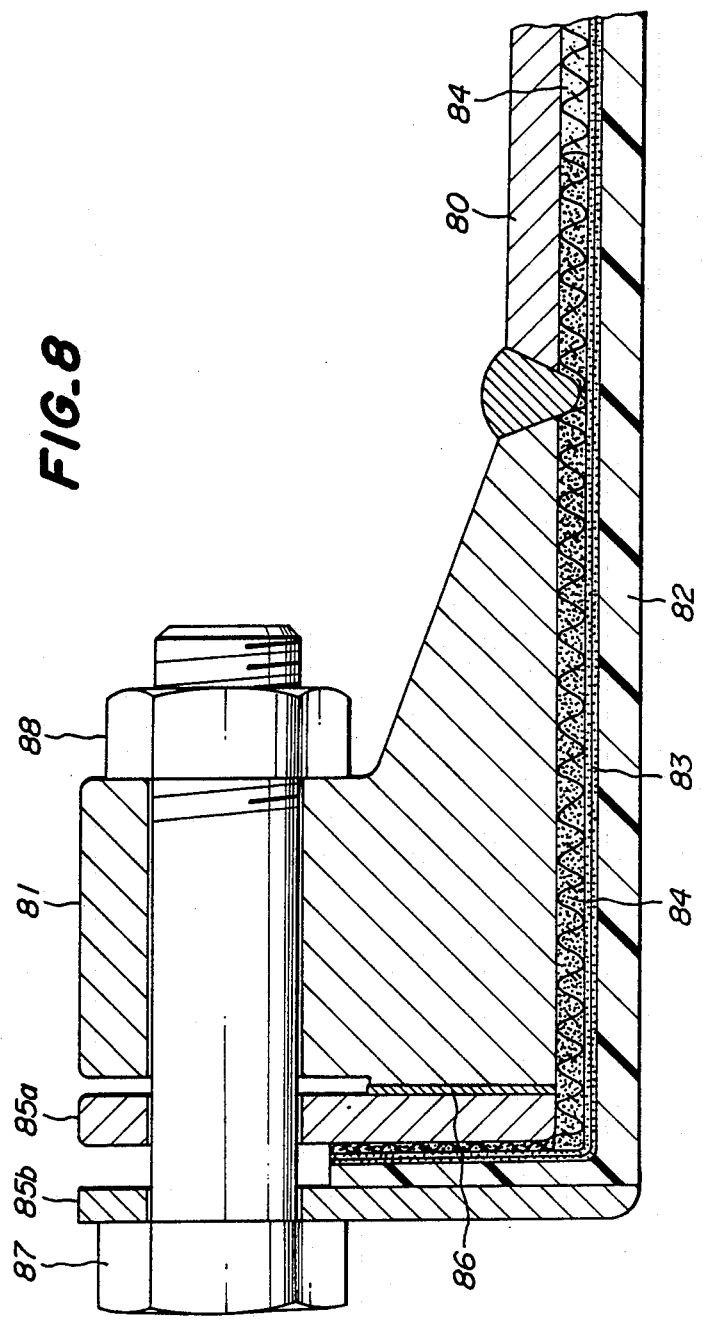
FIG. 8 is a partly section view of the end portion of the line pipe according to the invention.
Figure 9A:
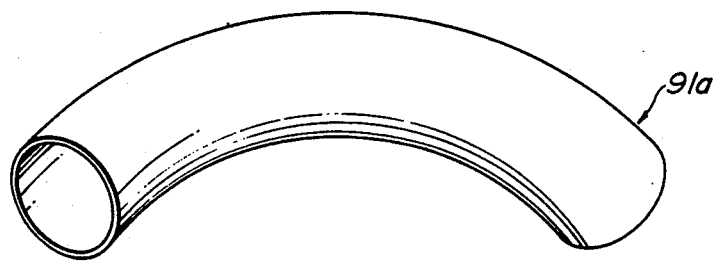
FIGS. 9a to 9d are schematic views illustrating steps for lining a curved line pipe according to the invention, respectively.
Figure 9B:
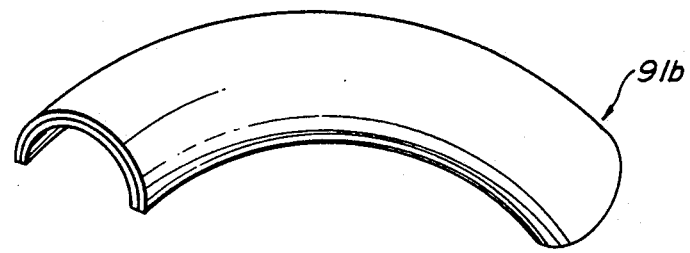
Figure 9C:
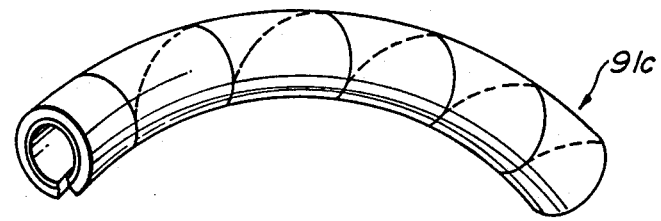
Figure 9D:
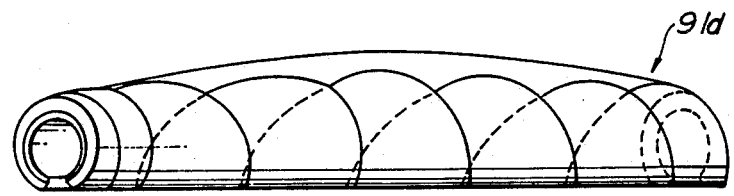

In the line pipe according to the invention, it is a first essential point that the woven fabric impregnated with the liquid plasticizer is interposed between the line pipe and the pressure sensitive adhesive double coated sheet.

The woven fabric is desirable to be made from a material having a rigidity, particularly a material having a rigidity enough to withdraw to shearing yield stress subjected to the lining tube of a material having a rich stretchability such as flexible rubber or the like.

The liquid plasticizer impregnated in the woven fabric is a substance acting to the pressure sensitive adhesive sheet and the pressure sensitive adhesive filled in the annular space of the expansion joint portion to enhance the plasticity thereof, which has a proper viscosity penetrating into gaps of the woven fabric but not flowing out therefrom due to its deadweight nor squeezing out by slight stress.

For example, there may be mentioned a solution an organic rust preventive agent in liquid polybutene resin and/or a mixture of liquid polybutene resin and an inorganic rust preventive agent as the plasticizer having such properties.

When the woven fabric impregnated with the liquid plasticizer is interposed between the line pipe and the pressure sensitive adhesive sheet, if the position shifting between the line pipe and the lining tube is caused, the shearing stress applied to the pressure sensitive adhesive sheet can be relaxed by the action of the woven fabric.

As shown in FIG. 5, if rust, scale, scab and the like are existent in the inner peripheral surface of the line pipe, the above liquid plasticizer penetrates into a gap portion 51 created in these defects, an air retaining portion 52, and a gap portion in a weld zone 53, and effectively serves to prevent storing of high pressure gas and corrosive substance therein.

Further, the liquid plasticizer impregnated in the woven fabric 54 serves to soften the pressure sensitive adhesive 55 or the like filled in the annular space C of the expansion joint portion and facilitate the flowing thereof. As a result, when the annular space C between the line pipes is shrinked by the action of a moderate force such as temperature change or by the action of a rapid force such as earthquake or the like, the softened and easily flowing pressure sensitive adhesive 55 flows in the longitudinal direction of the woven fabric and dispersedly penetrates into the woven fabric to absorb so-called extra adhesive and liquid plasticizer. On the other hand, when the annular space C is inversely enlarged, the pressure sensitive adhesive 55' moves from the woven fabric 54 toward the annular space C and also the liquid plasticizer oozes from the woven fabric toward the space C.

A second essential point in the line pipe according to the invention lies in that the above high viscosity and non-drying pressure sensitive adhesive is filled in the annular space C created in so-called expansion joint. This pressure sensitive adhesive is a substance exhibiting a rheological (viscoelastic) behavior. That is, this substance gently flows under a moderate loading such as temperature change likewise liquid or exhibits a solid-like behavior under the action of rapid external force such as earthquake. Therefore, the pressure sensitive adhesive showing elastic deformation is required to have a penetration degree of 30~100°, preferably 30~50°.

FIG. 6 shows a relation between shearing tensile velocity V and shearing yield stress S in the pressure sensitive adhesive. As seen from FIG. 6, the shearing yield stress S reduces with the decrease of the shearing tensile velocity V as the property of the pressure sensitive adhesive used in the invention, but it does not drop below a limit shearing stress Sc of 80 g/cm$^2$. This means that when a shearing force over the limit shearing stress Sc is applied to the pressure sensitive adhesive (at a very slow velocity), the adhesive flows likewise the liquid.

In case of the usual solid adhesive, the shearing adhesion strength is 10~25 kg/cm$^2$, which is very large as compared with the pressure sensitive adhesive. That is, when the external force over the above value is applied to the solid adhesive, the adhesion breakage occurs different from the case of the pressure sensitive adhesive.

The pressure sensitive adhesive according to the invention is a non-crosslinking high molecular weight polymer permanently exhibiting an adhesion property but being not solidified by drying or polymerization different from the solid adhesive, which is produced, for example, by mixing an elastomer (natural rubber, butyl rubber), a plasticizer (polybutene resin), a filler, an antioxidant, a thicker (talc powder, calcium carbonate power, clay) and the like at a given mixing ratio.

According to the invention, the pressure sensitive adhesive is required to hold a friction force to pipe wall accompanied with the flowing of fluid in the pipe, so that pressure sensitive adhesives having a limit shearing stress larger than the above friction force are used.

For example, when rapid external force such as earthquake is applied to the pipe, the pressure sensitive adhesive filled in the annular space serves to prevent the displacement between the pipe and lining tube through dash pot action. Further, this adhesive is displaced by elastic stretching of the joint as a rigid body, but it shows a large viscosity resistance to such a displacement to absorb vibrations accompanied with this displacement. On the other hand, a small shearing force is acted to the moderate displacement accompanied with the change of temperature, water temperature or the like such as stretching in the axial direction of the pipe, so that the pressure sensitive adhesive flows likewise liquid to relax stress to such a displacement.

In general, the pressure sensitive adhesive has a velocity (time) dependency as shown in FIG. 6 and also has a temperature dependency. That is, the viscosity increases as the temperature lowers. Furthermore, the limit shearing yield stress Sc differs in accordance with the thickness of the pressure sensitive adhesive, which is in inverse proportion to the thickness.

The shearing yield stress of the pressure sensitive adhesive was measured at various velocities under the following conditions to determine the limit shearing yield stress Sc at a lowest temperature.

Test temperature:
Lowest temperature in a region for arranging line pipes
Material of pressure sensitive adhesive:
Same composition as in the pressure sensitive adhesive sheet used for lining the line pipe
Thickness of pressure sensitive adhesive:
Same thickness as in the pressure sensitive adhesive sheet used for lining the line pipe
Outside of lining tube:
Between the inner peripheral surface of the line pipe and the lining tube are arranged pressure sensitive adhesive layers 56a and 56b sandwiching a reinforcing sheet 58 as a core and having a sufficient durability to the limit shearing yield stress Sc at the lowest temperature, as shown in FIG. 5. When the line pipe is stretched by the temperature change or the like, the lining tube is not elongated owing to the pressure sensitive layers 56a and 56b and the reinforcing sheet 58, while the woven fabric 54 impregnated with the liquid plasticizer corresponds to such an elongation of the pipe and hence the plasticizer flows out from the woven fabric to cause stress relaxation.

The pressure sensitive adhesive is filled in the annular space C to such an extent that the pressure sensitive adhesive somewhat expands toward the inner surface side of the line pipe considering the stretching of the annular space. When the pressure sensitive adhesive 55 is filled to such an extent that the inner face of the lining tube somewhat protrudes inward, the lining tube in the expansion joint portion initially expands, and finally becomes flat. That is, since the woven fabric 54 impregnated with the liquid plasticizer is interposed between the inner peripheral surface of the line pipes 50a, 50b and the outer peripheral surface of the pressure sensitive adhesive layer 56a, when a pressure is applied to the inside of the line pipe, the liquid plasticizer oozes out from the woven fabric to soften only the pressure sensitive adhesive therearound. Consequently, only the softened pressure sensitive adhesive flows and diffuses in the axial direction of the line pipe, and the woven fabric 54 itself moves together under an influence of the pressure inside the pipe, whereby the lining tube is held at a flat state.

Moreover, the pressure sensitive adhesive is softened by contacting with the liquid plasticizer to lower the viscoelastic (rheological) property. According to the invention, therefore, in order to apply a case that the viscosity of the pressure sensitive adhesive extremely lowers due to the influence of temperature or the rubber ring in the expansion joint degrades in hot water transportating pipe or the like, it is desired to embed the separation sheet 57 in the pressure sensitive adhesive.

As the separation sheet 57, a material not permeating the liquid plasticizer is used. By embedding such a separation sheet 57 in the pressure sensitive adhesive 55 at the annular space, the viscosity of the pressure sensitive adhesive portion 55a not contacting with the liquid plasticizer is made high. Particularly, the use of the separation sheet 57 effectively acts and largely contributes to prevent the degradation of the rubber ring or if being degraded, the leakage of fluid from the expansion joint portion because the pressure sensitive adhesive portion is hard outside the separation sheet and the pressure sensitive adhesive portion inside the separation sheet is softened through the plasticizer.

Moreover, the pressure sensitive adhesive sheet arranged along the inner peripheral wall of the line pipe is necessary to have a sufficient durability to the friction force of the pipe wall against the fluid passing through the pipe. In this connection, an example of calculating the friction force of the pipe wall under conditions that the inner diameter of the line pipe is 24 cm, the length of the pipeline is 1 km and the pressure loss is 30 kg/cm$^2$ is disclosed in Japanese Patent laid open No. 60-121380. According to this article, the friction force of pipe wall is 1.7 g/cm$^2$, which shows a largest friction force. Generally, the friction force is fairly smaller than the above value. As previously mentioned, the limit shearing yield stress should be larger than the friction force of the pipe wall.

When the space of the annular space portion C varies in accordance with stretch sliding of the pipe, the relative displacement between the line pipe 50a, 50b and lining tube 60 is created to produce a shearing stress therebetween. And also, the shearing stress is caused by the difference in thermal expansion coefficient between the line pipe and the lining tube. By these shearing stresses, the liquid plasticizer impregnated in the woven fabric 54 is fluidized at an fabric 54.

Further, when uneven portions are created in the inner peripheral surface of the line pipe by the welding between the pipes and the occurrence of recess through galling, the liquid plasticizer in the woven fabric buries these uneven portions to make the inner surface of the lining tube flat. In this case, it is important that proper fludization and thickness are given to the pressure sensitive adhesive layer by the liquid plasticizer to make the inner peripheral surface of the lining tube flat. Form this viewpoint, it is desirable that the shearing yield stress of the pressure sensitive adhesive is not excessive.

According to the invention, when the pressure sensitive adhesive sheet is formed inside the line pipe, a pressure sensitive adhesive double coated sheet is first adhered to the outer surface of the lining tube, and then the thus treated lining tube is adhered to the inner peripheral surface of the line pipe. The pressure sensitive adhesive double coated sheet is formed by applying a pressure sensitive adhesive to both surfaces of a reinforcing sheet as a core body at a given thickness. Moreover, the thickness of the pressure sensitive adhesive adhered to each surface of the sheet is necessary to be unchangeable till the lining tube 60 is completely drawn inside the line pipes 50a, 50b, so that the pressure sensitive adhesive is preferable to be hard.

That is, the thickness of the pressure sensitive adhesive applied to each surface of the sheet is dependent upon the function of the adhesive, the diameter of the pipe and the like, but it is usually about 1 mm. As the reinforcing sheet, use may be made of sheets or nonwoven fabrics of nylon, tetron, metal and the like. In other words, the reinforcing sheet 58 and the woven fabric 54 have a proof strength durable to a force for drawing the lining tube into the line pipes and do not elongate unnecessarily.

According to the invention, Neotape No. 5222 (trade name, made by Matsumura Sekiyu K.K.) is used as an example of the pressure sensitive adhesive double coated sheet. In this case, the pressure sensitive adhesive has a penetration degree of 30~45° (according to JIS K2207, 25° C., 5 sec, 50 g). The reason why the penetration degree is limited to the above range is based on the fact that the thickness of the double coated sheet does not change till the lining tube adhered with this sheet is drawn into the inside of the line pipes after the transportation from the storing position, but the pressure sensitive adhesive is softened by the liquid plasticizer in the woven fabric to smoothen the uneven portions (weld beads and the like) on the inner peripheral surface of the line pipe. Similarly, the pressure sensitive adhesive filled in the annular space of the expansion joint portion is preferable to be hard when the line pipes are connected to each other.

In this way, the lining laminate according to the invention can be formed.

When the pressure sensitive adhesive double coated sheet is adhered to the outer surface of the lining tube, as shown in FIG. 7, a lining tube 71 is folded into a flat form, and pressure sensitive adhesive double coated sheets 72 and 73 are adhered under a pressure to upper and lower surfaces of the folded lining tube, and further woven fabrics 74 impregnated with a liquid plasticizer are adhered thereto. In this case, it is important that air is not retained in the pressure sensitive adhesive double coated sheet. If the lining is conducted at a state that air remains in the sheet, the remaining air is collected through the pass of the pig member to form an air lump. When the pressure of the fluid becomes negative in use, the air lump expands to cause the peeling of the lining tube. Consequently, the lining tube is not supported by the reinforcing sheet and is locally elongated.

Therefore, when the line pipe is durable to negative pressure, it is required to suck out air from the inside of the line pipe in vacuo before the enlarging of the folded lining tube. On the other hand, when the line pipe is not durable to negative pressure, the enlarging rate of the folded lining tube is necessary to be made slow so as to sufficiently discharge out the remaining air in the enlargement of the lining tube.

As shown in FIG. 8, a flange 81 is attached to an end of a line pipe 80, and a lining tube 82, a pressure sensitive adhesive double coated sheet 83 and a woven fabric 84 are sandwiched between a pair of fastening members 85a and 85b, which are clamped through a gasket 86 by means of a bolt 87 and a nut 88.

According to the line pipe end of the above structure, liquid can not penetrate from exterior between the line pipe and the lining tube, and the liquid plasticizer impregnated in the woven fabric is not squeezed out therefrom to the outside. In this case, a high viscosity pressure sensitive adhesive is impregnated in the end portion of the woven fabric 84 instead of the liquid plasticizer, whereby the adhesion property of the woven fabric 84 is enhanced to increase the airtightness of the lining laminate structure at the end portion of the line pipe.

The operation method of arranging the lining tube inside the pipeline including the expansion joints through the pressure sensitive adhesive and woven fabric will be described in detail below.

The operation method comprises the following steps:

(a) step in which a flexible lining tube covered with a pressure sensitive adhesive double coated sheet (pressure sensitive adhesive layer) and a woven fabric impregnated with a liquid plasticizer is folded and rounded as shown in FIG. 7 and a fastening string is spirally wound therearound for storing;

(b) step in which the flexible lining tube stored at the folded state is drawn from an end portion of a pipeline comprised of many line pipes through the guiding of a wire rope and passed to the other end of the pipeline;

(c) step in which ends of the flexible lining tube, pressure sensitive adhesive layer and woven fabric are adhered and fixed to a flange arranged on an inlet end portion of the pipeline, while a launcher for pig member is disposed at the inlet side of the pipeline and a catcher for pig member is disposed at an outlet side of the pipeline, and further a pig member having a freely shrinkable diameter larger than a diameter of the line pipe is arranged in the launcher and fitted into an opening portion of the flexible lining tube; and (d) step in which the inside of the pipeline is held under vacuum and then a compressed air is pumped into the launcher to pressurize a back face of the pig member and at the same time air is sucked out from the catcher (under vacuum) to progress the pig member forward, whereby the folded flexible lining tube is successively enlarged and adhered to the inner peripheral surface of the pipeline through the pig member.

In this method, the liquid plasticizer may be impregnated in the woven fabric just before the drawing of the lining tube into the line pipe.

Moreover, curved pipe, branched pipe and the like may be existent in the pipeline. In this case, it is necessary that as the form of the lining tube, a branched tube, curved tube or the like is previously adopted so as to meet with the branched pipe, curved pipe or the like.

FIG. 9 shows a method for drawing a curved lining tube into a pipeline containing a curved line pipe therein. In this case, a surface of a lining tube is coated with a liquid plasticizer such as polybutene resin, whereby the adhesion of the pressure sensitive adhesive sheet to the lining tube is prevented for a given time. Thus, the lining tube can be curved in accordance with the curved line pipe at same position and curvature as in the curved line pipe of the pipeline without being restrained by the reinforcing sheet in the pressure sensitive adhesive sheet (FIG. 9a). Then, the curved lining tube is folded in a flat form (FIG. 9b), rounded and fixed by spirally winding a fastening string therearound (FIG. 9c). Thereafter, the curved lining tube is drawn from the inlet end of the pipeline up to the given position through the guiding of a wire rope and successively enlarged toward the inner peripheral surface of the curve line pipe through the pig member.

That is, the curved lining tube 91a having the same curvature as in the curved line pipe is connected to the lining tube at the same position as in the curved line pipe in the pipeline. Then, it is folded in a flat form 91b and rounded into a cylindrical form 91c, which is held by spirally winding the fastening string therearound. Thereafter, the curved form of the lining tube is corrected by drawing the string (91d), and the outer peripheral surface thereof is covered with the pressure sensitive adhesive sheet and woven fabric (not shown) for use in the lining of the pipeline. In this case, the drawing force of the lining tube is born by the pressure sensitive adhesive sheet and the woven fabric so as not to directly apply to the lining tube. Further, the tensile strength of the string is durable to reaction force of the rounded and corrected lining tube, but is broken when tension based on the pumping pressure of the pig member in the enlargement of the lining tube is applied to the string. Moreover, the broken string is held in the pressure sensitive adhesive sheet after the enlargement of the lining tube.

After the curved lining tube is enlarged, the liquid plasticizer applied to the surface of the curved lining tube is flown toward the pressure sensitive adhesive sheet by the tube enlarging pressure, fluid pressure and the like, whereby the mutual dissolution between the pressure sensitive adhesive and the liquid plasticizer is promoted to attain strong adhesion between the pressure sensitive adhesive sheet and the lining tube.

FIG. 10 shows a method of applying a lining tube to a pipeline having a branched line pipe. This method can be conducted in the same manner as in the method of using the curved lining tube.

That is, the outer surface of the lining tube 101 is firstly coated with the liquid plasticizer to prevent the adhesion to the pressure sensitive adhesive sheet over a given time. Then, a lining tube 103 for branching is rounded and held by spirally winding a fastening string therearound, which is connected to the lining tube 101 at a position corresponding to the branched position (102a) of the pipeline 102. Next, the lining tube 101 provided with the branched lining tube 103 is passed through the pipeline 102 and successively enlarged to the inside of the pipeline through pig members.

In the enlargement of the lining tube, a cannonball type pig member 104 and a spherical pig member 105 are progressed together in the lining tube by pumping a compressed air into the inside of the lining tube, whereby the cannonball type pig member 104 successively enlarges the main lining tube 102 and is discharged out from the outlet end of the pipeline 102, while the spherical pig member 105 turns at a branched point in a direction of the branched line pipe 102a and successively enlarges the branched lining tube 103.

Instead of the spherical pig member, a rubbery air bag (gum bladder) is inserted into the inside of the lining tube at a position near to the branched portion and the compressed air is pumped into the inside of the air bag, whereby the branched lining tube can be enlarged.

Even in case of the pipeline provided with a manhole, the lining can be performed by the above methods.

When the pressure sensitive adhesive sheet is adhered to the lining tube, strong adhesion can be obtained by applying a primer to the surface of the lining tube or by subjecting the surface of the lining tube to a specific treatment.

Moreover, the swelling of the lining tube may be caused in accordance with the kind of the liquid plasticizer used. In this case, a material having a function for preventing diffusion of the liquid plasticizer is used as a reinforcing sheet of the pressure sensitive adhesive sheet. For example, nylon tape is used by previously subjecting both the surfaces of the tape to ozone treatment for enhancing the adhesion property.

The fastening member for the end of the lining tube is previously attached to the flange portion of the pipeline before the drawing of the lining tube, and rear ends of the lining tube, pressure sensitive adhesive sheet and woven fabric containing the liquid plasticizer are fixed to the flange face of the pipeline through the fastening member.

Furthermore, positions of the lining tube and the line pipe in circumferential direction thereof can be accurately positioned by meeting bolt holes of the fastening member and the flange with each other through bolts.

Such a positioning is particularly important when the different size pipe is existent in the course of the pipeline because the form of the lining tube is previously formed so as to meet with the pipeline containing the different size pipe as mentioned above.

The meeting of positions between the line pipe and the lining tube in circumferential direction is also important in case of the pipeline transportating abrasive fluid because it is required to adopt the use of the lining tube having a thicker thickness at its lower side portion.

Moreover, the fastening member arranged to the flange portion at the outlet end of the pipeline serves as a regulating plate (spacer) for adjusting the difference in the length of the lining tube at this end portion of the pipeline.

An also, outer fastening member in the two fastening members (e.g. 85b in FIG. 8) is removed when the pipeline is connected to another pipeline.

The following examples are given in illustration of the invention and are not intended as limitations thereof.

EXAMPLE 1

FIG. 1 shows a first embodiment of connecting line pipes to each other through a sleeve type expansion joint according to the invention. In this case, a tapered portion t is formed on each end of line pipes 1a and 1b to be connected to each other, and a pair of rubber rings 2a, 2b are fitted onto the opposed tapered portions t, and the outside of these rubber rings 2a, 2b is covered with an elastic band 3, and further a rigid outer sleeve 4 is fitted onto the outer surfaces of the line pipes 1a, 1b and the band 3, whereby the expansion joint is constructed. Furthermore, a plurality of rigid seal rings 5 are secured to the inner peripheral surface of the outer sleeve 4 so as to contact with the outer peripheral surfaces of the line pipes 1a, 1b. Moreover, high viscosity and non-drying pressure sensitive adhesives 8a and 8b are filled in a space portion defined by the seal ring 5 and the rubber rings 2a, 2b and an annular space between the rubber rings 2a and 2b.

On the other hand, a flexible lining laminate 6 comprised of a woven fabric 10 impregnated with a liquid plasticizer, a viscous pressure sensitive adhesive layer 9 (pressure sensitive adhesive double coated sheet) and a lining tube 11 is formed on the inner peripheral surfaces of the line pipes 1a and 1b over a whole region inclusive of the expansion joint portion in the axial direction thereof. That is, the lining laminate 6 is formed without interrupting at the annular space portion C in the expansion joint for the connected line pipes 1a and 1b. Although the non-drying pressure sensitive adhesive 8a filled in the annular space portion C somewhat projects toward the inner peripheral surfaces of the line pipes 1a and 1b, such an extra adhesive is softened by the liquid plasticizer impregnated in the woven fabric 8 to flow in the axial direction of the pipe, so that the portion of the lining laminate 6 corresponding to the annular space portion C becomes flat without swelling.

EXAMPLE 2

FIG. 2 shows a second embodiment of connecting line pipes to each other through another expansion joint. In this case, an outer sleeve 22 having a tapered portion h in its inner peripheral face of each side end is fitted onto end portions of line pipes 21a and 21b to be connected at the outside of these pipes. A pair of flanges 23a, 23b each having plural bolt holes are arranged on the outer surfaces of the pipes at both sides of the outer sleeve 22 and fastened with each other through bolts 24 and nuts 25. Further, a pair of rubber rings 26a and 26b are interposed between each tapered portion h of the outer sleeve and each of the flanges.

On the other hand, a flexible lining laminate 20 comprised of a high viscosity and non-drying pressure sensitive adhesive double coated sheet layer 28a, a woven fabric 29 impregnated with a liquid plasticizer and a lining tube 27 is formed on the inner peripheral surfaces of the line pipes 21a and 21b. In this case, the lining laminate 20 is not interrupted over the whole of the pipeline likewise the case of Example 1 because the lining laminate portion located at a position corresponding to the annular space portion C between the connected line pipes 21a and 21b has a flat shape without swelling. Moreover, a pressure sensitive adhesive 28b is filled in the annular space portion C. Even if the volume of the annular space portion C is increased by shrinking the pipes 21a and 21b to enlarge the distance of the annular space portion, the shortage of pressure sensitive adhesive due to the increase of volume can be supplemented by the flowing of the liquid plasticizer impregnated in the woven fabric 29 and the surrounding pressure sensitive adhesive softened by this liquid plasticizer. Moreover, when shearing force is applied to the line pipes 21a, 21b and the lining tube 27, the woven fabric 26 easily moves accompanied with the flowing of the liquid plasticizer, so that there is no fear of locally elongating only the portion of the lining tube corresponding to the annular space portion C as in the conventional technique.

EXAMPLE 3

FIG. 3 shows a third embodiment of connecting line pipes to each other through the other expansion joint.

A line pipe 31 is airtightly connected to another line pipe 32 by fitting the pipe 32 into an end portion of the pipe 31, interposing a rubber ring 33 in a stuffing box defined between the pipes 31 and 32, and pushing and supporting the rubber ring 33 with a ground cover 34. In this case, the ground cover 34 is fastened to the pipe 31 through stud bolt 35 and nut 36.

On the other hand, a flexible lining laminate 30 comprised of a pressure sensitive adhesive double coated sheet layer 38, a woven fabric 39 impregnated with a liquid plasticizer and a lining tube 37 is formed on the inner peripheral surface of the line pipes 31, 32 over a full length of a pipeline likewise the cases of Examples 1 and 2. Furthermore, a pressure sensitive adhesive 38a is filled in an annular space C of the expansion joint portion through a separation sheet 38b, wherein the pressure sensitive adhesive 38a separated by the separation sheet 38b and facing the woven fabric 39 is softened by the liquid plasticizer in the woven fabric 39, so that the portion of the lining tube located at a position corresponding to the annular space C has a flat shape without swelling.

EXAMPLE 4

FIG. 4 shows a fourth embodiment of connecting line pipes to each other through a further expansion joint. This embodiment basically uses a sleeve type expansion joint similar to those of Examples 1 to 3.

In this case, a line pipe 41 is connected to another line pipe 42 by inserting the pipe 42 into an end portion of the pipe 41, airtightly inserting a rubber ring 43 into a stuffing box defined between the outer peripheral surface of the pipe 42 and a cut space below the flange end of the pipe 41, and pushing the exposed face of the rubber ring 43 with a ground cover 44. Moreover, the ground cover 44 is fixed to the flange portion of the pipe 41 through stud bolts 45 and nuts 46. On the other hand, a convex portion i is formed on the outer peripheral surface of the pipe 42 in place, while a concave portion j is formed on the inner peripheral surface of the ground cover 44. Thus, the stretching of the connected pipes 41 and 42 is restrained by the convex portion i and the concave portion j.

In the above structure, a pressure sensitive adhesive 48a is filled in an annular space C of the expansion joint portion through a separation sheet 48b, and a pressure sensitive adhesive 48c is filled in a space produced in the joint portion between the convex portion i and the concave portion j. On the other hand, a flexible lining laminate 40 comprised of a pressure sensitive adhesive double coated sheet layer 48, a woven fabric 47 impregnated with a liquid plasticizer and a lining tube 49 is formed on the inner peripheral surfaces of the connected pipes 41, 42 over a full length of a pipeline likewise the cases of Examples 1 to 3.

As mentioned above, the line pipes according to the invention have the following merits:

(1) In the expansion joint portion for the line pipes, there is no uneven portion as in the conventional technique, so that the erosion, cavitation and the like are not caused and also the sedimentation of earth and sand can be prevented, and consequently the damage of rubber ring (packing) as well as the leakage of water can be prevented.

(2) The thickness of the conventional lining tube is about 0.5 mm~3.00 mm, while the thickness of the lining laminate according to the invention can freely and properly be changed in accordance with the use purpose, but is usually within a range of 6~60 mm. Particularly when the dredged stones are transported, the thickness may be more than 60 mm. According to the invention, therefore, the durability of the pipeline can be improved and the maintenance cost can be reduced.

(3) Since the expansion joint portion can be completely covered with the pressure sensitive adhesive, the rubber ring and the like can be separated from fluids passing through the pipeline, and consequently the degradation of the line pipe and the occurrence of rust or the like can be prevented.

(4) The pressure sensitive adhesive is substantially filled in the space of the expansion joint portion, whereby the flexibility as the joint is improved. As a result, such an expansion joint has an effect for laying a pipeline on complicated topography and is excellent in the ability of absorbing and relaxing external force such as earthquake or the like for reducing the damage of the joint.

(5) Even when the annular space changes due to the change of the joint portion, the swelling of the lining tube is not caused, and consequently the wearing of the lining tube at the position corresponding to the joint portion can be prevented.

(6) Even when relative displacement between the line pipe and the woven fabric is generated by rapid change of the expansion joint portion, the liquid plasticizer impregnated in the woven fabric flows at the interface, and consequently a large shearing stress is never applied to the woven fabric.

(7) The presence of the woven fabric serves to reduce the strength of the reinforcing sheet to be embedded in the pressure sensitive adhesive and also acts to prevent the damaging of the pressure sensitive adhesive double coated sheet and the lining tube in the drawing of the lining tube into the inside of the line pipe. Further, the liquid plasticizer impregnated in the woven fabric acts as a lubricant to reduce the drawing force for the lining tube. Therefore, thick and heavy lining tube can easily be drawn over a long distance.

(8) The woven fabric impregnated with the liquid plasticizer is existent in the lining laminate according to the invention, so that even when defect portions such as rust, scale and the like are existent in the inner surface of the line pipe, the liquid plasticizer containing a rust preventive agent penetrates into these defect portions. Therefore, careful surface treatment for the line pipes is useless.

(9) Even when overs and shorts in the amount of the pressure sensitive adhesive in the annular space is caused due to the relative displacement in the stretching of the line pipe, they are rapidly corrected by the flowing of the liquid plasticizer impregnated in the woven fabric as well as the surrounding pressure sensitive adhesive softened by the liquid plasticizer, so that the joint portion can be always held in a flat form.

(10) Even when shearing stress is caused between the line pipe and the lining tube by the relative displacement due to the stretching of the line pipe, relaxation of stress is rapidly caused by the liquid plasticizer in the woven fabric, and consequently the aging and degradation of the lining laminate through the stress are not caused and the durability is improved.

(11) In the conventional method for lining a curved line pipe, a straight lining tube is curved for lining, so that wrinkles are generated inside the curved portion to make the flow resistance large, while the thickness of the lining tube is reduced outside the curved portion by tension to leave tensile stress and the degradation due to stress is apt to be caused.

On the contrary, according to the invention, the lining tube having a curvature equal to that of the curved pipe is drawn into the pipeline in place. That is, the lining tube comprises straight lining tube portion and curved lining tube portion and is adhered to the inner peripheral surface of the pipeline through the woven fabric and pressure sensitive adhesive sheet after the enlargement of the lining tube, so that the degradation of the curved lining tube hardly occurs.

(12) According to the invention, the worn lining tube can easily be peeled off from the inner peripheral surface of the pipeline and replaced with a new lining tube. That is, the fixed portion of the worn lining tube is released at each end of the pipeline and then compressed air is pumped between the pipeline and the woven fabric, whereby the worn lining tube can easily be peeled off from the pipeline. Further, the worn lining tube can easily be removed out from the pipeline by drawing the woven fabric.

(13) According to the invention, the lining laminate is applied to simple joining between pipes for transportation of sewage or the like, whereby the leakage of sewage from the joint portion as well as the releasing of the joint portion due to earthquake can easily be prevented.

What is claimed is:

1. A line pipe comprising two pipes disposed in end-to-end relationship and connected to each other through an expansion joint, there being an annular space between adjacent ends of said two pipes, a lining tube secured inside said pipes by a pressure sensitive adhesive, a woven fabric impregnated with liquid plasticizer containing a rust preventive agent disposed between said pressure sensitive adhesive and said adjacent ends of said pipes, and a pressure sensitive adhesive in said annular space and said lining tube, pressure sensitive adhesive and woven impregnated fabric all extending continuously from one pipe to the other across said gap.

2. The line pipe according to claim 1, wherein a separation sheet is embedded in said pressure sensitive adhesive in said annular space to prevent diffusion of said liquid plasticizer from said woven fabric toward said expansion joint.

* * * * *